United States Patent [19]

Riach, Jr.

[11] Patent Number: 4,988,181
[45] Date of Patent: Jan. 29, 1991

[54] ORNAMENTAL DEVICE FOR EYEGLASSES

[76] Inventor: George Riach, Jr., 10424 Cary Cir., Cypress, Calif. 90630

[21] Appl. No.: 509,356

[22] Filed: Apr. 16, 1990

[51] Int. Cl.$^5$ .............................................. G02C 11/02
[52] U.S. Cl. .......................................... 351/52; 351/51
[58] Field of Search ...................... 351/50, 51, 52, 158

[56] References Cited
U.S. PATENT DOCUMENTS 4,245,896  1/1981  Kaplan ................................. 351/52

Primary Examiner—Paul M. Dzierzynski
Attorney, Agent, or Firm—Francis X. LoJacono

[57] ABSTRACT

An ornamental device for eyeglasses which comprises an ornament adapted to be attracted by a magnetic force, wherein the ornament is positioned on the front surface of at least one of the glass member elements of a pair of eyeglasses, one or more magnets being placed adjacent the rear surface of the glass element whereby the magnetic force from the magnet holds the ornament in a selective position on the glass element.

12 Claims, 1 Drawing Sheet

ORNAMENTAL DEVICE FOR EYEGLASSES

BACKGROUND OF THE INVENTION

1. Field of the Invention. The present invention relates generally to eyeglasses and more particularly to an ornamental device that is designed to be movably mounted to one or both of the glass members of a pair of eyeglasses by means of one or more magnetic members.

2. Description of the Prior Art. As is well known in the art eyeglasses, there are many varied shapes and designs that contribute to the aesthetics of spectacles. Accordingly, when the rim members of such spectacles that hold the glass pieces are combined with different configurations of nose and temple pieces together with the hinge members, many unique overall eyeglass designs can be provided. Thus, glasses is readily provided with a large selection of designer eyeglasses to choose from.

However, it will be seen that with the present invention a more personalized arrangement of the glasses is now possible, whereby selective ornaments may be attached to the glass pieces and readily moved to any position thereon as desired.

In this respect, ornamental attachments have been tried but have met with little acceptance. This has been due to the limited positioning capabilities, as well as to the added cost of securing the ornamental object to the glass pieces. As an example of a fixed ornamental piece, there is disclosed in U.S. Pat. No. 4,245,896 to Michael A. Kaplan a spectacle having an ornament affixed to one of the glass pieces. The ornamentation is provided by an ornament to which is attached a threaded stem member that constitutes a screw. A connecting member is provided that forms a screw for attaching to the threaded stem member of the ornament. The glass member of the eyeglasses includes a through hole having an enlarged end portion. To mount the ornamentation the stem member is positioned within the through hole from the front of the glass member with the ornament being positioned on the outer side thereof. A nut member is screwed to the free end of the stem so as to be received within the enlarged recess end portion of the hole. Thus, the ornamentation is fixed in a permanent location and can not be relocated to a different position on the glass piece.

In U.S. Pat. No. 4,795,235 to Larry A. Spitzberg, there is disclosed a bioptic periscope affixed to the glass piece wherein the glass piece includes a through hole to secure the device to the glass.

OBJECTS AND ADVANTAGES OF THE INVENTION

It is an important object of the present invention to provide an ornamentation for mounting to one or both glass pieces of a pair eyeglasses wherein the placement of the ornament thereof can be readily moved to any desired location on the face of the glass member.

Another object of the invention is to provide an ornamentation that includes an ornament that is adapted to be attached to the glass pieces by means of one or more magnets.

Still another object of the present invention is to provide an ornamental device comprising an ornament, preferably of metal, that reacts to magnetic forces, thus allowing for the simple change of the ornament when desired.

A further object of the invention is to provide for an ornamental device for eyeglasses wherein the device includes an ornament having a magnet attached thereto so as to be placed on the outer surface of a glass member, and a second magnet positioned against the rear surface of the glass member, whereby the oppositely disposed magnets will be positionally arranged so as to be attracted to each other, causing the compatible magnetic forces to secure the ornament to the glass member or element of the eyeglasses.

A still further object of the invention is to provide for an ornamental device for eyeglasses wherein the device includes an ornament attracted by the magnetic force of a magnet so that the ornament is held on the outer or front surface of the glass element of the spectacle opposite from a first magnet made from a flexible or pliable material which is secured to the inner or rear surface.

Yet another object of the present invention is to provide an ornamentation of this character wherein the ornament includes a first magnet affixed thereto, so that the ornament and first magnet is positioned on the outer surface of a glass piece and a second magnet is attached to the inner surface of the glass piece, the second magnet being formed from a thin flexible material. A third super magnet is mounted over the second magnet.

A further object of the invention is to provide an ornamentation of this character that is readily adjustable to any desired location on the surface of the glass piece without the need of altering the surfaces of the glass elements of the eyeglasses.

It is still a further object of the invention to provide a device of this character that has no moving parts, and is simple and relatively inexpensive to manufacture.

The characteristics and advantages of the invention are further sufficiently referred to in connection with the accompanying drawings, which represent one embodiment. Variations may be made without departing from the principles disclosed and I contemplate the employment of any structures, arrangements of modes of operation that are properly within the scope of the appended claims.

BRIEF DESCRIPTION OF THE DRAWING FIGURES

With the above and related objects in view, the invention consists in the details of construction and combination of parts, as will be more fully understood from the following description, when read in conjunction with the accompanying drawings and numbered parts, in which.

DETAILED DESCRIPTION OF THE INVENTION

Figure 1:
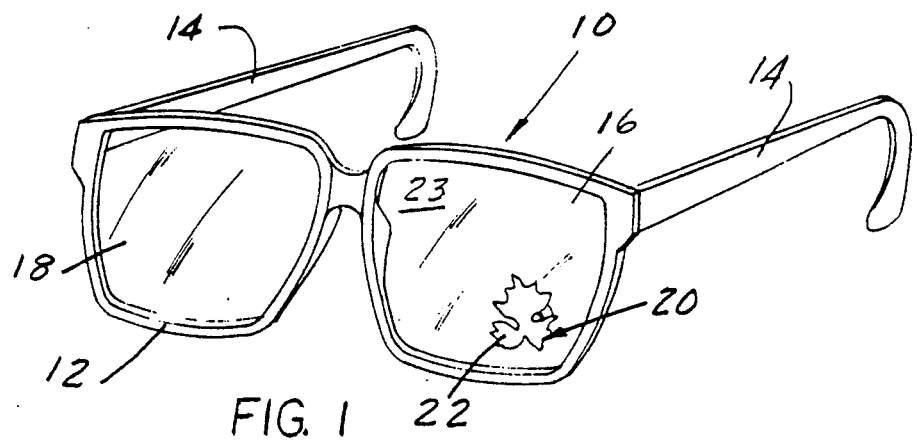
FIG. 1 is a perspective view of the present invention mounted to a pair of eyeglasses, illustrating the ornamentation mounted to one of the glass pieces in the lower right corner thereof.

Referring more particularly to the drawing in detail and more particularly to FIG. 1 thereof, there is illustrated therein a perspective view of a pair of eyeglasses in its entirety, which is generally indicated by numeral 10. The eyeglasses, otherwise referred to as spectacles, 10 include a frame member 12 to which there are respective temple pieces 14 hingedly connected thereto. As is commonly provided, there are together a first eyeglass element or member 16 and second eyeglass element or member 18, each being supported by frame member 12. As also illustrated in FIG. 1, eyeglass element 16 has mounted thereon the present invention that defines an ornamentation which is designated generally at 20. It is important to note that ornamentation 20 is particularly designed to be readily located at any point on one or both of the eyeglass members 16 and 18.

Figure 2:
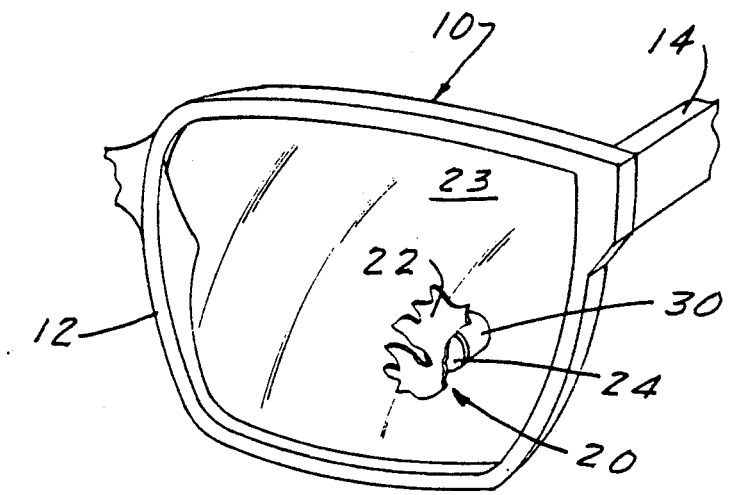
FIG. 2 is an enlarged perspective view of the right portion of the eyeglasses, showing the ornament member broken away to illustrate the positioning of the magnets located behind the ornament.

Accordingly, there are at least three arrangements of the present invention. The first arrangement comprises an ornament, as indicated at numeral 22, which is formed from a material that is attracted by the magnetic force of a magnet. In FIG. 2 there is illustrated an ornament 22 which is broken away to show at least one magnet positioned rearwardly of ornament 22. That is, ornament 22 is positioned against the front surface 23 of glass element 16; and at least one super magnet, designated at 24, is positioned on the rear surface 25 of the glass element. Thus, the magnetic force generated by magnet 24 will hold ornament 22 in any selected location on the surface of glass element 16, as indicated in FIG. 1 and 2.

Figure 3:
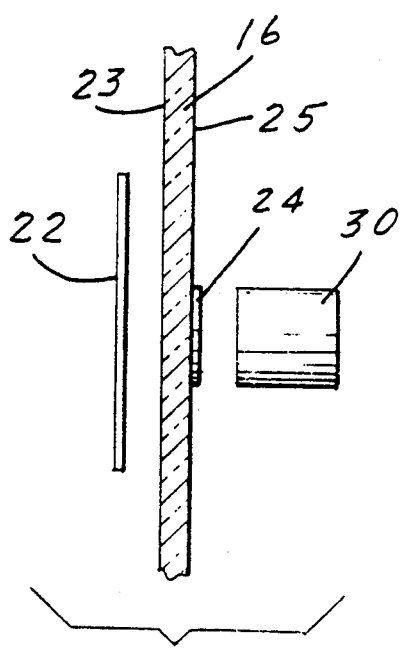
FIG. 3 is an exploded view of one embodiment of the invention with the glass piece in cross section.
Figure 4:
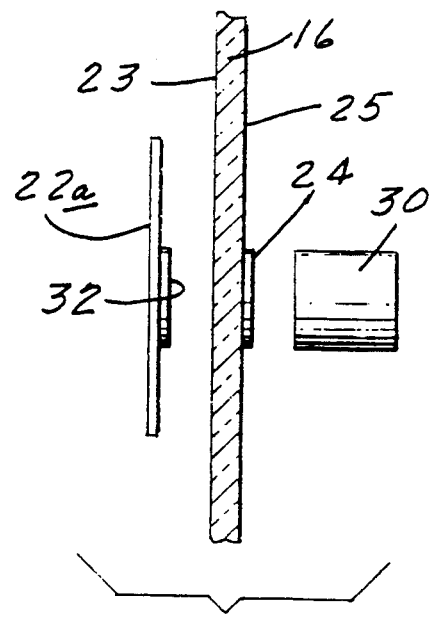
FIG. 4 is an exploded view similar to that of FIG. 3, showing another embodiment of the present invention.

However, the more preferred forms or arrangements are illustrated in FIGS. 3 and 4. In FIG. 3 the present invention is shown as comprising a metallic ornament 22 positioned in front of eyeglass element 16 so as to be placed directly on front surface 23. On the rear surface 25 of glass element 16 thin magnetic piece 24 is removably secured to surface 25. Magnetic piece 24 is made from a flexible or pliable material that is provided with suitable means for removably securing the magnetic piece 24 to a glass surface, such as rear surface 25. After magnetic piece 24 is affixed to glass surface 23, a second magnet 30 is mounted over magnetic piece 24. Ornament 22 is then placed on the outer surface 23 over the rearward positioned magnets 24 and 30. If one wants to reposition ornament 22, magnet 24 is removed and relocated as desired or a new magnetic piece can be employed.

Referring now to FIG. 4, there is shown another arrangement that is similar to that of FIG. 3, with the exception that ornament 22a is made from a nonmetallic material such as plastic, glass, ceramic, etc. Thus, a second magnetic piece 32 would be secured to the inner surface of the ornament 22a. Accordingly, magnets 32 and 24 would be attracted to each other and magnets 24 and 30 would also be attracted to each other, thereby securing ornament 22a in a fixed position.

It may be thus seen that the objects of the present invention set forth herein, as well as those made apparent from the foregoing description are efficiently attained. While preferred embodiments of the invention have been set forth for purposes of disclosure, modifications of the disclosed embodiments of the invention as well as other embodiments thereof may occur to those skilled in the art. Accordingly, the appended clams are intended to cover all embodiments which do not depart from the spirit and scope of the invention.

What I claim is:

1. An ornamental device for mounting to one or both glass elements of a pair of eyeglasses, wherein said device comprises:
    an ornament formed to be activated by means of a magnetic force, said ornament being positioned on the front surface of at least one of the glass elements of a pair of eyeglasses; and
    at least one magnet positioned on the rear surface of said glass element and positioned in alignment with said ornament mounted on the front surface of said glass element, whereby the magnetic force from said magnet holds said ornament in a selective position thereon.

2. An ornamental device as recited in claim 1, wherein said magnet is a super magnet.

3. An ornamental device as recited in claim 2, wherein said ornament is formed from a metal having an attraction to a magnetic force.

4. An ornamental device as recited in claim 3, including:
    a first magnet selectively positioned against the rear surface of said glass element; and
    a second magnet positioned to engage in cooperation with said first magnet, wherein the magnetic force from said first and second magnets hold said metal ornament to said glass element.

5. An ornamental device as recited in claim 4, including means for removably securing said first magnet to said glass element.

6. An ornamental device as recited in claim 5, wherein said ornament includes a third magnet affixed thereto so as to be positioned between said ornament and said front surface of said glass element, whereby the magnetic force of said third magnet is attracted by the force from said first and second magnets.

7. An ornamental device as recited in claim 1, wherein said ornament is formed from a nonmetallic material and includes a magnet affixed thereto so as to be positioned between said ornament and said front surface of said glass element.

8. In combination, an ornamental device and a pair of eyeglasses comprising:
    a pair of eyeglasses having a frame member and a pair of temple pieces;
    a pair of glass elements mounted in said frame member;
    an ornament formed to cooperate with a magnetic force, wherein said ornament is selectively positioned on the front surface of at least one of said glass elements; and
    at least one magnet positioned on the rear surface of said glass element in alignment with said ornament, whereby said ornament is held in a fixed position on said glass element.

9. The combination of claim 8, wherein said ornament is formed from a nonmetallic material and wherein a first magnet is secured to said ornament.

10. The combination of claim 9, including a second magnet affixed to said rear surface of said glass element, and means for removably securing said second magnet thereto.

11. The combination of claim 8, including:
    a first magnet secured to said ornament and positioned between said ornament and said front surface of said glass element; and
    a second magnet secured to said rear surface of said glass element.

12. The combination of claim 11, including a third magnet positioned against said second magnet.

* * * * *